(12) United States Patent
Koster

(10) Patent No.: US 9,602,663 B1
(45) Date of Patent: *Mar. 21, 2017

(54) MANAGING ELECTRONIC CONSENT FOR CALLING CAMPAIGNS

(71) Applicant: Noble Systems Corporation, Atlanta, GA (US)

(72) Inventor: Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/299,591

(22) Filed: Jun. 9, 2014

Related U.S. Application Data

(63) Continuation of application No. 13/971,093, filed on Aug. 20, 2013, now Pat. No. 8,781,107, which is a continuation of application No. 13/461,513, filed on May 1, 2012, now Pat. No. 8,548,133.

(51) Int. Cl.
  *H04M 3/51* (2006.01)
  *H04M 3/523* (2006.01)

(52) U.S. Cl.
  CPC ......... *H04M 3/5141* (2013.01); *H04M 3/523* (2013.01)

(58) Field of Classification Search
  USPC .................................................... 379/265.09
  See application file for complete search history.

(56) References Cited

U.S. PATENT DOCUMENTS

| | | |
|---|---|---|
| 6,694,298 B1 | 2/2004 | Teagarden et al. |
| 6,810,260 B1 | 10/2004 | Morales |
| 7,561,677 B2 | 7/2009 | Flynt et al. |
| 7,916,846 B1 | 3/2011 | Farah |
| 8,280,031 B2 | 10/2012 | Segall et al. |
| 8,358,771 B1 | 1/2013 | Moore et al. |
| 8,374,915 B2 | 2/2013 | Hayes, Jr. et al. |
| 8,403,222 B2 | 3/2013 | Kindberg et al. |
| 8,666,822 B1 | 3/2014 | Kaliss |
| 2002/0164006 A1 | 11/2002 | Weiss |
| 2003/0032409 A1 | 2/2003 | Hutcheson et al. |

(Continued)

OTHER PUBLICATIONS

9 QR Code Data Types, http://notixtech.com/blog/9_qr_code_data_types, Mar. 3, 2011.

(Continued)

*Primary Examiner* — Amal Zenati

(57) ABSTRACT

A user may provide electronic consent to a contact center authorizing the origination of a subsequent call by transmitting a text call in the form of a short message service to the contact center. The contact center receives the electronic consent, stores the electronic consent in an electronic consent database, where the electronic consent is associated with the telephone number of a mobile device used by the user to provide the electronic consent. The contact center may then retrieve the electronic consent prior to originating another call to the individual, and may further update the electronic consent based on requests from the individual to withdraw consent. In some embodiments, the electronic consent may be generated by the mobile device in response to the user reading a two-dimensional code using the mobile device using an appropriate mobile application.

20 Claims, 8 Drawing Sheets

(56) References Cited

U.S. PATENT DOCUMENTS

| | | | |
|---|---|---|---|
| 2004/0028213 | A1 | 2/2004 | Goss |
| 2005/0149399 | A1 | 7/2005 | Fukunaga et al. |
| 2005/0265322 | A1 | 12/2005 | Hester |
| 2006/0036487 | A1 | 2/2006 | Mann |
| 2006/0256957 | A1 | 11/2006 | Fain et al. |
| 2007/0094073 | A1 | 4/2007 | Dhawan et al. |
| 2007/0201646 | A1 | 8/2007 | Metcalf |
| 2008/0142599 | A1 | 6/2008 | Benillouche et al. |
| 2009/0029725 | A1 | 1/2009 | Kindberg |
| 2009/0082044 | A1 | 3/2009 | Okuyama et al. |
| 2010/0075634 | A1 | 3/2010 | Miller |
| 2010/0128862 | A1 | 5/2010 | Vendrow |
| 2010/0169130 | A1 | 7/2010 | Fineman et al. |
| 2011/0029380 | A1 | 2/2011 | Moukas et al. |
| 2011/0153398 | A1* | 6/2011 | Tjhai ............... G06Q 30/02 705/14.14 |
| 2011/0173040 | A1* | 7/2011 | Curtis ............... G06Q 10/06 705/7.13 |
| 2011/0182283 | A1 | 7/2011 | Van Buren et al. |
| 2011/0208578 | A1 | 8/2011 | Bergh et al. |
| 2011/0222679 | A1 | 9/2011 | Tal et al. |
| 2011/0258156 | A1 | 10/2011 | Fitzpatrick et al. |
| 2012/0128267 | A1* | 5/2012 | Dugan ............... H04L 67/36 382/321 |
| 2012/0261465 | A1 | 10/2012 | Vasquez et al. |
| 2014/0115004 | A1 | 4/2014 | Isaacs et al. |

OTHER PUBLICATIONS

Office Action Received for U.S. Appl. No. 13/461,515 dated Apr. 16, 2013.
Office Action Received for U.S. Appl. No. 13/470,757 dated Apr. 24, 2013.
Notice of Allowance Received for U.S. Appl. No. 13/461,515 dated May 23, 2013.
Corrected Notice of Allowance Received for U.S. Appl. No. 13/957,094 dated Jun. 17, 2014.
Office Action Received for U.S. Appl. No. 13/957,094 dated Jan. 10, 2014.
Notice of Allowance Received for U.S. Appl. No. 13/957,094 dated Mar. 10, 2014.
Notice of Allowance Received for U.S. Appl. No. 13/470,757 dated Jun. 5, 2013.
Notice of Allowance Received for U.S. Appl. No. 13/940,628 dated May 5, 2014.
Firmus Energy, Terms and Conditions, http://www.firmusenergy.co.uk/comp-terms-conditions.htm, 2011.
Office Action Received for U.S. Appl. No. 13/461,541 dated Jun. 19, 2014.
Office Action Received for U.S. Appl. No. 14/863,717 dated Feb. 11, 2016.
Notice of Allowance Received for U.S. Appl. No. 14/863,717 dated May 2, 2016.
Office Action Received for U.S. Appl. No. 14/242,081 dated Dec. 8, 2014.
Office Action Received for U.S. Appl. No. 14/242,081 dated Mar. 10, 2015.
Office Action Received for U.S. Appl. No. 13/461,541 dated Jul. 16, 2015.
Notice of Allowance Received for U.S. Appl. No. 14/242,081 dated Jul. 16, 2015.
Derek Johnson, SMS Marketing with QR Codes, May 27, 2011, Tatango, http://www.tatango.com/blog/sms-marketing-with-qr-codes/.
Notice of Allowance Received for U.S. Appl. No. 13/461,541 dated Nov. 6, 2015.
Notice of Allowance Received for U.S. Appl. No. 14/956,656 dated Apr. 28, 2016.
Office Action Received for U.S. Appl. No. 13/461,541 dated Dec. 18, 2014.

* cited by examiner

| Link to Electronic Consent Data | Form | Telephone Number | Permission Last Updated | Account Info |
|---|---|---|---|---|
| http://permission.acme.com/4045551212 | PFD | 404 555 1212 | 03-1-2012 | Current |
| http://permission.acme.com/4045551228 | Web | 404 555 1228 | 03-11-2012 | Past Due |
| http://permission.acme.com/4045560020 | Voice | 404 556 0020 | 03-15-2012 | Past Due |
| ... | | ... | | |

FIG. 5

MANAGING ELECTRONIC CONSENT FOR CALLING CAMPAIGNS

CROSS REFERENCE TO RELATED APPLICATIONS

This application is a continuation of U.S. patent application Ser. No. 13/971,093, filed on Aug. 20, 2013, which in turn is a continuation of U.S. patent application Ser. No. 13/461,513, filed on May 1, 2012, entitled Managing Electronic Consent for Calling Campaigns, and is related to U.S. patent application Ser. No. 13/461,541, filed on May 1, 2012 entitled Using Quick Response Codes to Generate An Electronic Consent Database, and U.S. patent application Ser. No. 13/461,515 filed on May 1, 2012, entitled Integrating Two-Dimensional Barcodes and Embedded Links With Call Center Operation, the contents of all of which are incorporated by reference in their entirety for all that they teach.

BACKGROUND

Telemarketers may originate outbound calls to a list of telephone numbers from a call center on behalf of a client (e.g., an enterprise) to execute a calling campaign. The purpose of such calling campaigns may be telemarketing, informational, or other aspects related to providing customer service.

In the past, a call center could contact an individual on behalf of the enterprise using an autodialed prerecorded voice call, provided the enterprise had an established business relationship with the individual. For example, a bank issuing credit cards to its customers could contact its customers based on having an established business relationship with these customers. These calls were exempt from certain federal regulations that would otherwise prohibit pre-recorded telemarketing calls to the called party. However, new regulations require an enterprise to obtain express consent from the called party prior to initiating an autodialed pre-recorded telemarketing call to the called party. In many instances, the called party may find receiving the pre-recorded call useful and may provide advance explicit consent for receiving such calls. Once this consent is obtained, then the enterprise can contact the individual. The enterprise needs to maintain records of the individual's explicit consent, and must be able to produce the same if required to demonstrate compliance with the regulatory requirements.

It is with respect to these and other considerations that the disclosure herein is presented.

BRIEF SUMMARY

Technologies are generally presented herein pertaining to managing electronic consent provided by an individual to a call center for receiving a subsequent call. The electronic consent may be provided to the contact center as a text call originating from a mobile device, which the contact center processes. Specifically, the electronic consent data ("ECD") may be stored in an ECD database. In addition, in some embodiments, metadata comprising the telephone number of a mobile device may also be stored in the ECD database. Subsequently, a call to the telephone number maybe originated by the contact center. After a call is initiated to individual, a request to opt-out from receiving similar future calls may received at the contact center and the ECD database may be updated to reflect this.

The subject matter disclosed herein may be implemented as a computer-controlled apparatus, a computer process, a computing system, or as an article of manufacture such as a computer-readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 5 shows one embodiment of a data structure used to manage electronic consent for a list of telephone numbers;

DETAILED DESCRIPTION

Figure 1:
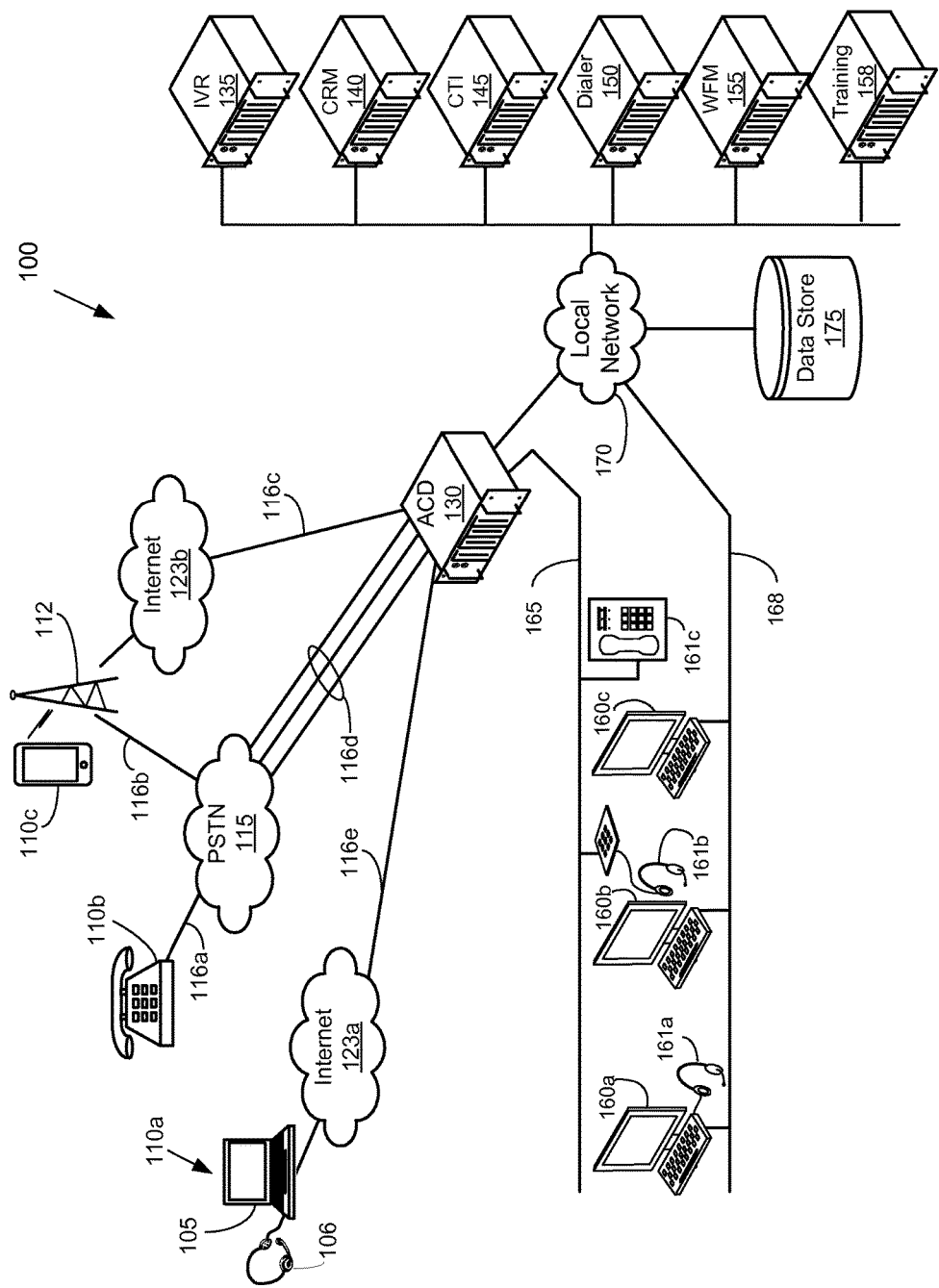
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process calls that are inbound-only, outbound-only, or a combination of both (sometimes referred to as a "blended" call center). Although many aspects of call center operation is disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from or placed to the party. The term "caller," if used, will generally refer to a party calling the call center, but in many cases this usage is exemplary. Thus, use of the term "caller" is not intended to necessarily limit the concepts herein to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123a using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Voice calls may also originate from a calling party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two way communication, or a portion of the two-way communication. For example, a user at a conventional telephone 110b can dial a telephone call in an attempt to establish two-way communication, and a call can be said to exist even prior to establishment of a two way connection. In another example, a call may be put on hold, and a portion of the call may be referred to as a "call leg" existing between the caller and certain equipment. A call may comprise a number of concatenated call legs, as known to those skilled in the art. In certain contexts, the call may encompass communications other than voice, e.g., text, email, video chat, facsimile, etc.

Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including, but not limited to, a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to either the data or voice capability at the agent's position as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

An agent typically logs onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service) to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data retrieved from the data store 175 are presented at the agent's headset 161*b* and their computer 160*b*. In other embodiments, data may be stored in the data store 175 by the agent, ACD, or other entity.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other servers, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160*a*-160*c*, as well as other components, may involve using a local area network ("LAN") 170. Other communication configurations are possible, such as, but not limited to, using a wide area network, wireless network, router, bridge, direct point-to-point links, etc.

When an agent is interacting with a called or calling party, the agent may use their workstation computer 160*b* to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, facsimiles, and the call center may also originate communications to a called party, referred to herein as "outbound" communications. In some embodiments, a call center may employ a dialer 150 to originate outbound calls on behalf of an agent at a rate designed to meet various criteria. Similar to the other components within the call center architecture 100, the dialer 150 may comprise a software modules executing on processing device hardware platform.

The dialer 150 is typically configured to dial a list of telephone numbers to initiate outbound calls, which can be accomplished in one embodiment by instructing the ACD 130 to originate calls. In some embodiments, the ACD may include functionality for originating calls, and if so, this component may be referred to as a private automatic branch exchange ("PBX" or "PABX"). In other embodiments (not shown), the dialer 150 may directly interface with voice trunks using facilities 116*c*, 116*d* to the PSTN 115 for originating calls. After the calls are originated, a transfer operation by the ACD 130 or by the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in a call center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to then generate a work roster of agents. In other words, the WFM server 155 schedules agents for their work shifts according to the anticipated needs of the call campaigns.

Finally, in various embodiments, the call center architecture 100 may include another server 156 to perform various functions. For example, the server 156 could be a quality assurance system that records communication fielded by an agent or allows a manager to monitor a voice session to ensure calls are being handled correctly.

Although the above components are referenced as "servers," each may be also referred to in the art a "processing device," "unit," or "system" and may incorporate a local data store, database, or interface with an external database. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into single hardware platform executing one of more software modules. In addition, the call center architecture 100 may be provided as a hosted solution, where the call processing functionality is provided as a communication service (a so-called "communication as a service" or "CaaS") to a call center operator. Thus, there is no requirement that the servers identified above actually be located or controlled by a call center operator.

In addition, the agent positions can be co-located in a single physical call center or in multiple physical call centers. The agents can be remotely located from the other components of the call center, and may also be remotely located from each other, sometimes referred to as a "virtual call center." A virtual call center may describe a scenario where agents to work at home, using their own computer and telephone as a workstation. In some configurations, a single physical location of the call center may not be readily identifiable. This may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, configurations, facilities, technologies, and equipment used. For example, various algorithms and queuing arrangements maybe defined to efficiently process calls. In other configurations, the ACD 130 may be configured to process not only voice calls, but also other forms of communication, and perform corresponding call processing functions for email, text, or facsimile calls. Alternatively, a web server (not shown in FIG. 1) may receive or originate email and text communications, as well as interact with other call center components.

Figure 2:
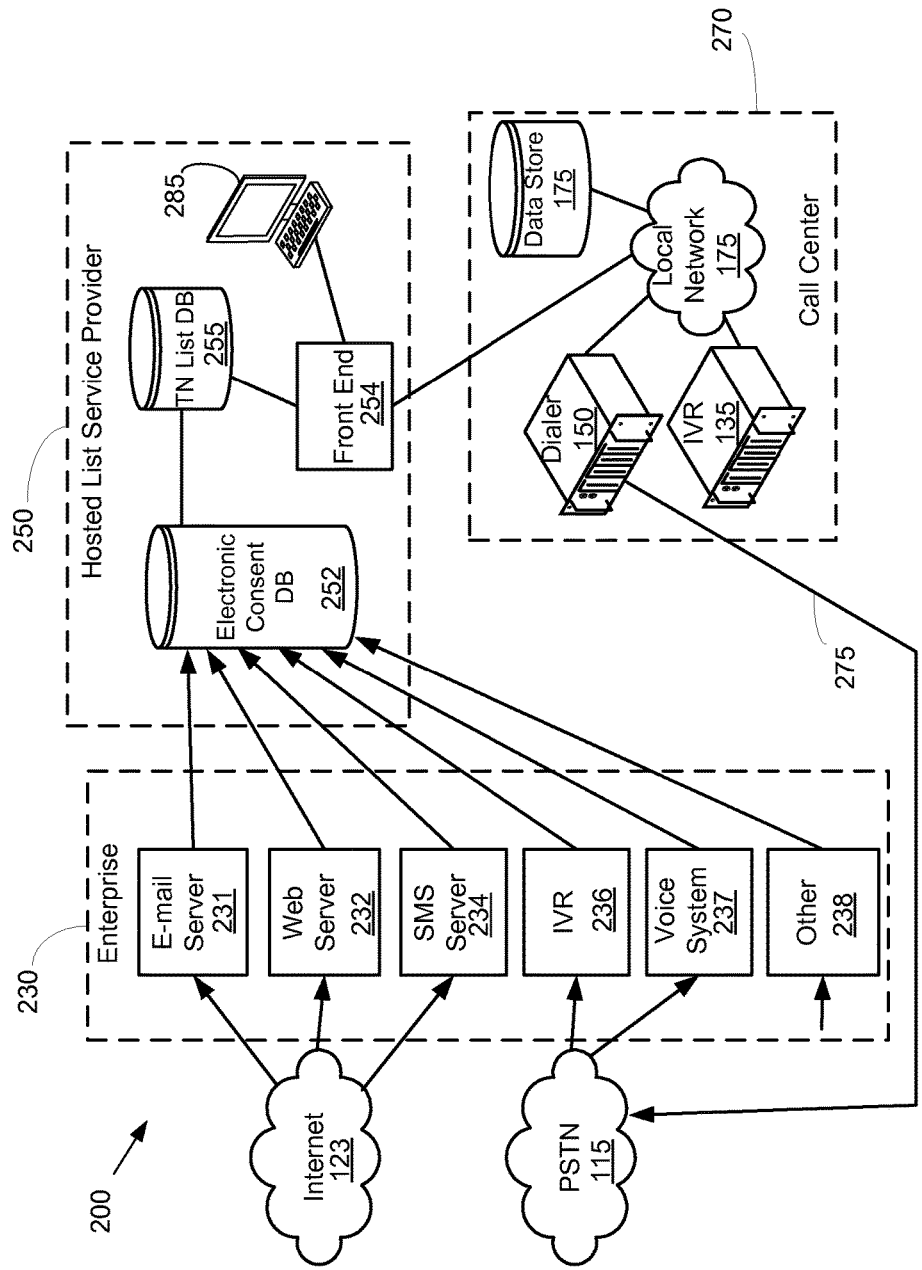
FIG. 2 shows one embodiment of the relationship between an enterprise, a hosted list service provider, and a call center in regards to managing electronic consent for outbound calls.

Relationship Between an Enterprise, a Hosted List Service Provider, and a Call Center FIG. 2 illustrates one embodiment of the relationship between an enterprise 230, a hosted list service provider ("HLSP") 250, and a call center 270. The enterprise 230 could be any form of commercial business (as well as a non-profit organization or business), and is presumed to have a list of contact information of individuals that it seeks to interact with. Interaction may occur by a call center operated internally to the enterprise, or as a third party external call center. This list may be a list of customers and may include their names, telephone numbers, purchasing history, and other information that may be maintained by a customer relationship management system or other information system. Although the term "customer" may be used, this term should not interpreted as being constrained to only referring to individuals that have purchased, may purchase, or otherwise are consumers of the enterprise 230. The individual could be, for example, a patient receiving health related information, a student receiving school closing information, etc. Correspondingly, the enterprise could be a non-profit medical clinic, a school, etc. However, for purposes of illustration and simplicity, the individual providing the electronic consent is referred to as a "customer" and the organization to which it is provided is the "enterprise."

The customer may provide the enterprise 230 with express electronic consent for the purpose for receiving an automatically dialed pre-recorded voice call, such as for telemarketing purposes. In other embodiments, the consent may be for receiving a short message service ("SMS") message call, facsimile, email, or other form of communication.

The enterprise 230 may maintain various systems that facilitate receiving customer contact. These systems may include an email server 231 that may receive email communication from the Internet 123. However, the unstructured content of an email message may make accurate computer processing difficult, and hence require a human to read the contents. Customers may also interact with a web site hosted by a web server 232. A web site allows customers to easily provide structured information, such as their name and telephone contact information, which can be easily processed by computing devices. Typically, the email server 231 and the web server are connected to the Internet 123 for receiving customer originated communication.

Further, the enterprise could also receive instant messages at an SMS server 234. Although SMS messages may be conveyed by specialized signaling networks, it is possible in some embodiments for the SMS server 234 to receive such message via the Internet 123. In particular, gateways for converting messages from an SMS message to an email message are known to those skilled in the art. Thus, it is possible to receive the contents of an SMS message in an email. The SMS server 234 may perform, or be connected to, such a gateway type of function. Other configurations for sending/receiving text messages in the form of SMS are possible.

Other forms of access provided by the enterprise for customer contact may include an IVR 236. The customer can use the telephone for accessing an automated IVR 236 that may collect customer consent information. Another form of access is a voice system 237 which may direct an incoming call from a customer to an agent (such as those described in FIG. 1). In addition, other forms of communication systems 238 can be provided. For example, customer input could be provided via written communication, such as facsimile or postal mail. These communications may be processed by the enterprise, with corresponding information entered into customer relationship management systems.

Each of these communication approaches may involve a unique infrastructure for processing the communication. The technology for email servers, web servers, and IVR components are well known, as are the infrastructure and technology required to handle voice calls, SMS, or other forms of communication. Each communication approach can potentially be used by the enterprise 230 to receive "electronic consent" from an individual indicating authorization to receive future communication. The electronic consent includes digital or electronic signatures, and would encompass any form of indication sufficient to be recognized as consent. Various forms of express consent are possible, including those identified by the Electronic Signatures in Global and National Commerce Act ("E-SIGN"). Although this is sometimes referred to by others as "written consent," this is recognized as allowing voice consent to be a recognized form of consent.

Consider, for example, that an airline may provide information at its web site for a potential customer seeking information on upcoming airfare sales to certain locations. The individual may indicate preferences for locations, days, and indicate a telephone contact number for receiving automated calls. The web site can also expressly request the user to provide electronic consent. The request for this information may be received at a web server 232 that provides an easy-to-use interface that can be used to forward the individual's telephone number for inclusion into a notification list. Indicating consent can be accomplished by the user typing in their name in an appropriate location with appropriate indications.

For each communication approach that a customer may use to provide consent to the enterprise 230, the enterprise 230 may maintain a digital record of the consent provided. With regard to email, completing a web page, or sending and SMS message, the data itself can be easily retained as an electronic record. For example, a customer completing a web page indicating their name, telephone number, and selecting a check box authorizing receipt of future communications is evidence the user provided electronic consent.

The consent can be retained in different formats. For the IVR or voice system, voice conversations with an agent or keypad responses provided to an IVR can be digitally recorded and/or analyzed as evidence of consent. For other forms, paper forms or letters can be scanned into any number of the well known file formats, such as JPEG or PDF files, and stored as digital image files. Each instance of electronic consent can be treated as a distinct electronic consent file, or they can be records within a consent file.

With each electronic consent data file it is necessary to define corresponding electronic consent metadata ("metadata"). This metadata provides information about various aspects of the electronic consent data, including the individual it is associated with, when the electronic consent was obtained, how the electronic consent was received, etc. The metadata is linked to each corresponding electronic consent data file, allowing retrieval and review of the electronic consent data files. In one embodiment, the metadata includes a telephone number, so that verification of electronic consent can be easily retrieved and verified using the individual's telephone number. The metadata can serve as an index to retrieve the electronic consent data file, and may include other information, such as the individual's name, address, etc.

While each of the server/systems 231, 232, 234, 236, 237, and 238 may retain a copy of, or a link to, the electronic consent data file in a database, having each server/system retain a copy means that the various instances of electronic consent data files are maintained in a distributed manner throughout the enterprise. Auditing a user's consent is complicated by having to check with the various systems that must be examined to ensure that an accurate summary is determined. It becomes difficult to manage a logical set of data when it is stored and independently managed on distinct systems. Further, updating the consent (e.g., to withdraw consent) is difficult when multiple data stores are maintained.

It is preferable to have a central repository of electronic consent records. To simplify recording keeping and other related functions, each enterprise server/system 231-238 may provide a copy of the electronic consent data it receives to an electronic consent database 252. The electronic consent database 252 is a central repository and is able to store, index, and retrieve the electronic consent in various forms, including, but not limited to: scanned image files, voice recordings, text, HTML, email, etc.

The electronic consent database 252 may be operated by a hosted list service provider 250 as opposed to an enterprise. The hosted list service provider 250 can offer the list management services for various enterprises, and it can provide a common, single repository for electronic consent for the enterprise 230. Because the list service provider provides a computer service to the enterprise, it can be referred to as "hosted." Thus, typically a network service is used to transmit the data from the enterprise 230 to the hosted list service provider 250. When referring to a "list management provider" herein, this refers to an entity that can provide the services either on a fee-for service basis (and is then considered a hosted list service provider) or internal to a call center or enterprise (which may not be a on a fee-for service basis). The hosted list service provider can provide efficient storage, retrieval, and updating of the electronic consent. Further, other economies of scale can be provided, as the hosted list service provider can "scrub" the data using other databases. As will be seen, the contents of the electronic consent database need to be harmonized with other databases which may indicate other restrictions associated with the telephone number. For example, the data can be checked or identified as being a wireline or wireless number. This becomes important as individuals may port their wireline number to their wireless number.

Although not shown in FIG. 2, there may be a number of different locations associated with a single enterprise, or multiple distinct and diverse enterprises, that provide electronic consent data to the hosted list service provider 250. The hosted list service provider 250 may be based on a cloud computing platform that provides a reliable, centrally identifiable, database for the enterprise. Simply maintaining a central repository for an enterprise location in the premises of the enterprise 230 may not be sufficient to access electronic consent for the overall enterprise, since many enterprises have multiple locations which can receive customer authorization. If each enterprise location has its own central repository, then the issue of managing multiple databases still exists. The hosted list service provider may render an invoice of the fee for its service to the enterprise, which can be computed based on the number of telephone numbers involved, storage capacity required, etc. The hosted list service provider may also provide value added services of verifying telephone numbers against other databases, such as state or federal do-not-call ("DNC") databases or wireless number lists.

The hosted list service provider 250 is well positioned to compare the telephone numbers in the electronic consent database received from an enterprise 230 with telephone numbers in the DNC databases, which may be periodically updated. For example, if an individual has previously requested that their telephone number should be included in a DNC database, and then later explicitly provides written consent to an enterprise for receiving calls, the fact that the written consent was provided subsequently can be interpreted as the individual authorizing calls from that enterprise, but not other entities. On the other hand, if the individual subsequently requests their telephone number to be included in a DNC database after having explicitly provided written consent, then that could be interpreted as having withdrawn all prior express written consent. The user's intentions may be based on how and when such requests are made. For example, an individual may update a state DNC list by communicating with a state agency, not realizing that this may preclude them from receiving communication from an enterprise in that state that the user does want to receive. In this case, the hosted list service provider 250 could inform the enterprise 230 of this occurrence, and the enterprise could contact the individual to clarify the authorization status. It would be beneficial for the enterprise to be able to contact the individual and then reinstate express consent for future communications. The enterprise may contact the individual using a telephone call by an agent, or an automatically dialed call with an IVR to verify the status. In some embodiments, the hosted list service provider may maintain an email database which may include an email or SMS address for the individual. Thus, for example, an email could be transmitted to the individual as another approach for reestablishing or confirming electronic consent in such a circumstance, where the email may not be subject to the same regulations governing calls.

Although FIG. 2 depicts the enterprise 230 providing the electronic consent data directly to the electronic consent database 252, the hosted list service provider 250 may require the electronic consent data to be provided to the call center through a front end system ("front end") 254 (this arrangement is not depicted in FIG. 2). The front end 254 may incorporate various interfaces for receiving and transmitting queries, responses, and files, as discussed below.

The hosted list service provider 250 can store the electronic consent in the electronic consent database 252, and can also maintain, in one embodiment, a separate database of telephone numbers ("TN") in a TN list database 255. The TN list comprises a list of telephone numbers associated with the electronic consent, but may not contain all the information found in the electronic consent database. Frequently, the TN list, not the electronic consent data, is provided to the call center for performing the calling campaign. Although FIG. 2 shows the TN list as a separate list from the electronic consent database 252, the TN list can be stored in the same database and/or other structure as the electronic consent database 252 by the hosted list service provider 250. In some embodiments, the electronic consent data may also be provided to the call center. The TN list may comprise a subset of the metadata of the electronic consent data used by the call center to perform call origination. This TN list may be generated by processing the metadata from the electronic consent, or may be populated by other means. Because of the linkage maintained between the electronic consent and the telephone number, it is possible for the hosted list service provider to easily verify the corresponding electronic consent for each telephone number in the TN list.

The hosted list service provider may make available, or provide, the telephone numbers in the TN list to the call center in different ways. In one embodiment, the TN list maybe transmitted to the call center 270 as a file. This type of arrangement "pushes" the TN list to the call center, which stores the TN list in the data store 175. The call center 270 can then originate calls using the telephone numbers as defined by the calling campaign parameters. Alternately, groups of TN lists can be periodically transmitted to the call center (e.g., those required for each day of operation).

In another embodiment, the call center 270 may query the hosted list service provider on an "as needed" basis. This could be, for example, prior to initiating each call. The dialer 150 could launch a query to the front end 254 for each originating call. In other embodiments, the dialer may launch a query for a group of numbers prior to initiation, or for the entire day's file. This type of arrangement "pulls" numbers from the hosted list service provider 250 as needed and allows the call center 270 to obtain the appropriate telephone number information in real-time. This approach allows the hosted list service provider to provide an up-to-date status of telephone numbers.

In either the "push" or "pull" arrangement, the telephone numbers are transmitted from the hosted list service provider to the call center via a front end 254. The front end 254 can process queries in the "pull" data access arrangement, and perform various gate keeping functions. These functions include verifying that an allowed source (e.g., call center) is authorized to access and request the TN list from the hosted list service provider and ensures the rate of access is within allowed limits. For example, if a query is made for each TN prior to origination, a maximum rate at which queries can originate may be monitored. If the request is made for an entire TN list, then appropriate verification is required to ensure that the TN list can be provided to that call center. Because various call centers may be receiving numbers from the same hosted list service provider, each call center must be identifiable and must receive the appropriate TN list. Thus, each list may be associated with a particular call center, and a campaign in that call center.

Once the call center 270 receives the numbers, these can be cached or otherwise stored in the call center's data store 175, or within the main memory of the dialer 150. The dialer 150 can then use the telephone number to originate an outgoing call using, e.g., trunks 275 connected to the PSTN 115. Although the calls may originate using trunks, this should not be construed as limiting the type of access that can be used by the dialer 150. In other embodiments, the call can be a SMS message addressed to the (wireless) telephone number that is based on a prerecorded message content.

The dialer 150 can automatically dial a call and play a pre-recorded message. In various embodiments, the called party may be connected to an IVR for further interaction, in a manner that is well known to those skilled in the art. Furthermore, in some embodiments, the caller may choose to opt-out from receiving further pre-recorded calls. If the user elects to opt out, that information may be recorded by the IVR and copied into the data store 175, along with other call progress information that occurred. In other embodiments, the called party may speak to an agent. Typically, a log of call progress information is maintained for each of the dialed calls of a campaign, including whether an opt-out indication was received from the called party. This log is typically stored in a call log database that provides information about the call, including when it was made and the outcome.

The opt-out information comprises an indication associated with a telephone number which the call center may report back to the hosted list service provider 250. The opt-out information is relevant to managing the TN list database 255. Specifically, called parties that opt-out from such calls are noted so that subsequent calls are not made to that party.

The front end 254 is involved in ensuring that the opt-out numbers are properly processed from the call center. Thus, the front end 254 ensures that the call center 270 is authorized to indicate the information for modifying the TN list. Once the front end 254 receives the information, it updates the TN list in the TN list database 255. The front end 254 may also update the electronic consent database to update the metadata to reflect that the electronic consent is no longer valid. In some embodiments, a record of the opt-out request can be stored, along with the date, time, and campaign for which is occurred with by the hosted list service provider. In some instances, the opt-out request only is for a particular enterprise.

The hosted list service provider may also provide access to the electronic consent database 252 by an administrator, regulator, enterprise, or other third party. Access may be provided to a computer 285, which can access the electronic consent database 252 or the TN list database 255. In one embodiment, a graphical user interface is provided that allows the computer operator to request to view the electronic consent information for a given telephone number. The front end system 254 processes the information and retrieves the appropriate record, and provides the result to the computer for display. The information can be provided in a form that is appropriate for the consent data stored, e.g., as a web page, a PDF file, text string, or voice recording, which can be played back using any one of the well known media players or viewing programs at the computer 285. Thus, third party verification of the electronic consent data is readily possible.

Reports can be generated by the hosted list service provider detailing summaries of the disposition of each telephone number in a TN list. This includes when and to whom the TN list was provided and after completion of the calling campaign by a call center, how many of the telephone numbers resulted in an opt-out and when. These reports can be obtained or provided to the enterprise, regulatory agencies, or a third party. In other embodiments, agents of the call center 270 are able to retrieve the electronic consent data directly, and are able to deliver it to a third party computer, e.g., in an email, if requested.

Figure 3:
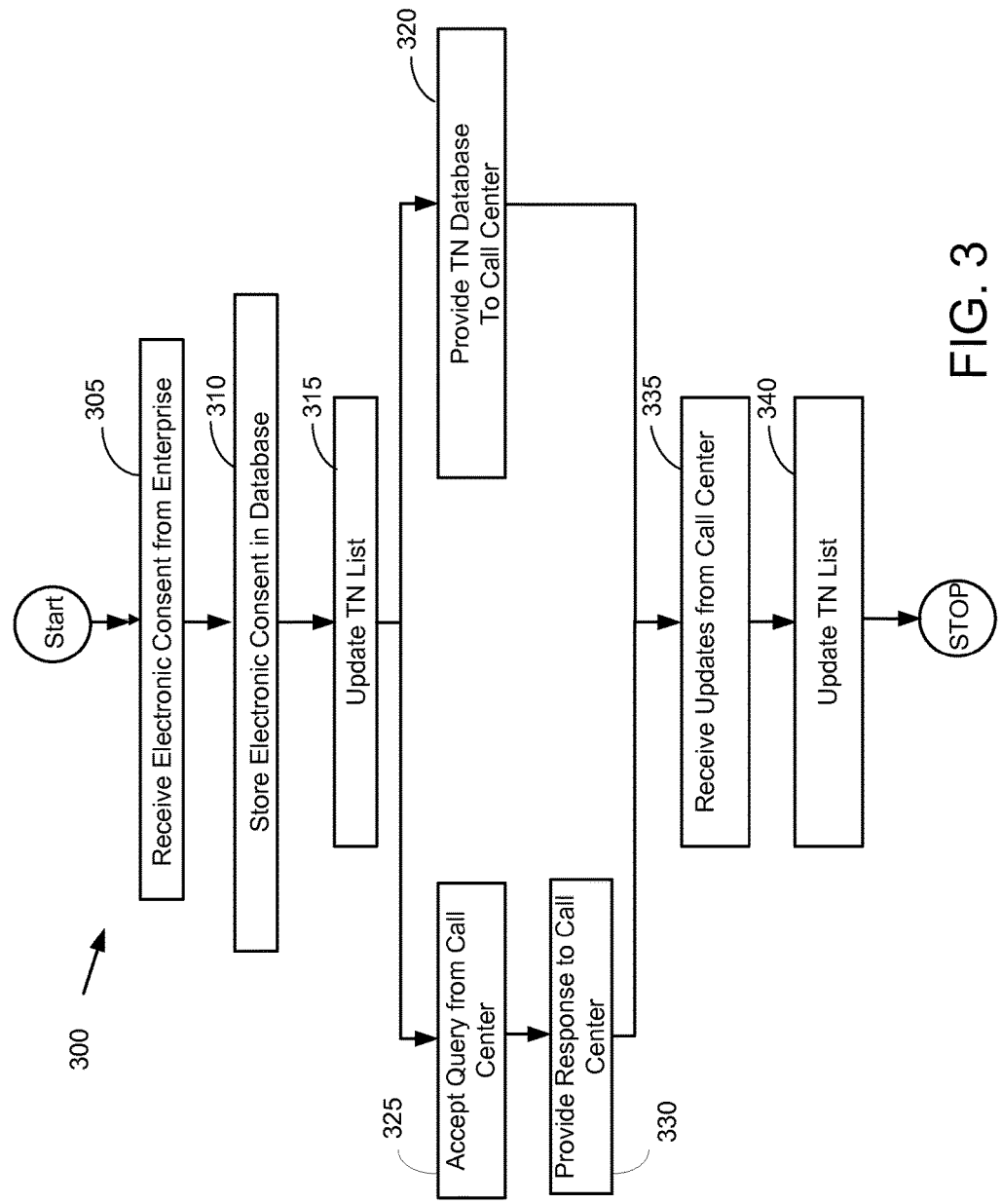
FIG. 3 shows one embodiment of the process flow for a hosted list service provider to manage electronic consent for a list of telephone numbers.

Turning now to FIG. 3, additional details will be provided regarding the process flows for the hosted list service provider. In particular, FIG. 3 is a flow diagram showing one embodiment of the operations that may occur in the hosted list service provider in forming and/or updating the TN list both in response to input from an enterprise (e.g., to include an opt-in from an individual), as well as input from a call center (e.g., to include an opt-out from an individual).

The logical operations described herein may be implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as states, operations, acts, or modules. These operations, acts, and modules may be implemented in software, in firmware, in special purpose digital logic, and any combination thereof. Greater or fewer operations may be performed than shown in the figures and described herein. These operations may also be performed in a different order than those described herein.

The process begins in operation 305 with the hosted list service provider receiving an instance of electronic permission in the form of a digital file from an enterprise entity. This can be a scanned image file, text message, a web based form, voice file, or other form. The hosted list service provider may receive various instances of different forms of electronic consent from various enterprise entities, but for illustrations purposes, only a single enterprise entity is presumed. The electronic consent can be received individually, or in a batch file from the enterprise.

The hosted list service provider in operation 310 then stores the electronic consent data in a database in a searchable manner. This operation may involve generating an associated metadata record. Once completed, then in operation 315 the TN list is updated by adding the appropriate telephone number and other data to that the electronic consent data to make it searchable.

The operations 305-315 may be repeated over time to build a TN list in the hosted list service provider. These operations represent collecting the user's consent via the aforementioned forms of customer interaction. In other embodiments, these operations may be performed in whole or in part by the enterprise, and the completed electronic consent data and the TN list is simply provided to the hosted list service provider in a desired format.

Once the TN list is generated, the hosted list service provider may provide the TN list to the call center. The two forms of access by the call center (e.g., "pull" and "push") are represented by the process flow of FIG. 3. First, in operation 325, the hosted list service provider may accept a query from the call center, such as on a per-telephone number basis. This is the "pull" form of access. If so, then in operation 330, the hosted list service provider may provide a response to the call center query with the telephone number. The response could be the next telephone number and associated information needed to originate a call. This process involving operations 325 and 330 could be repeated as necessary (the looping process is not shown in FIG. 3). In other embodiments, the query may be for a block of numbers.

In another embodiment, represented by operation 320, the hosted list service provider may provide the TN list to the call center (the "push" form of access). This may be the entire TN list, or a subset of the TN list. If the latter, then subsequent subsets may be pushed out to the call center (e.g., on a daily basis).

Once the call center 270 receives the telephone number information, it can execute the call for the call campaign (not shown in FIG. 3). A call to any given number may result in the called party providing an opt-out. For example, if the individual receives a text message for which consent was previously provided, the individual could opt-out by responding with "STOP" in a response message. If the individual receives a voice call, the individual could indicate this verbally, or using certain DTMF tones. In operation 335, these opt-out requests are provided back to the hosted list service provider from the call center. The opt-out information can be provided in real-time as received, or the results can be collected into a group and periodically transmitted to the hosted list service provider (e.g., batch transfer). The hosted list service provider then updates the TN list to reflect the opt-outs in operation 340. Further updates may be made to the electronic consent database as necessary (e.g., including further call centers). In some embodiments, this may include, e.g., either deleting the record or marking it as obsolete.

Figure 4:
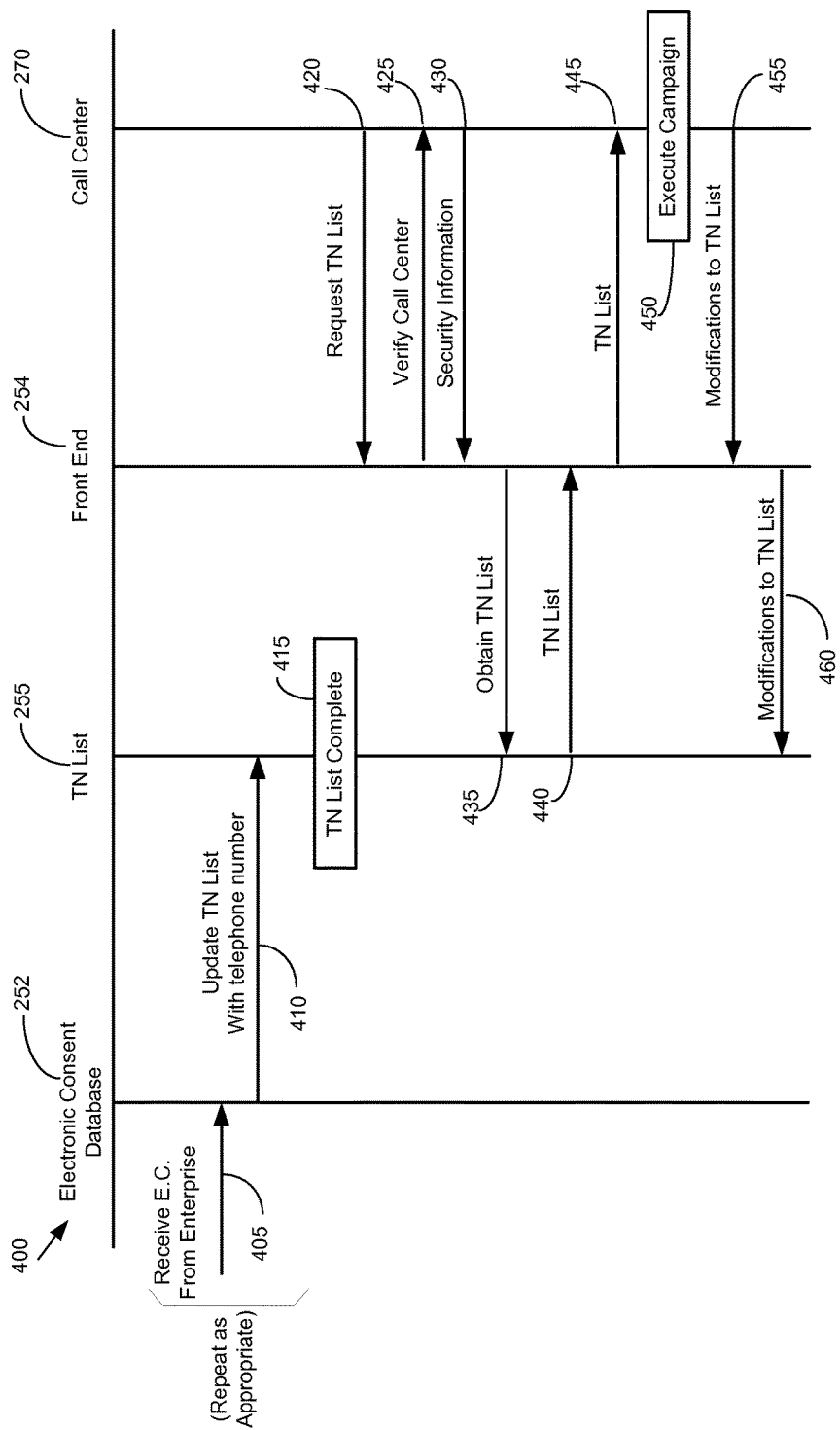
FIG. 4 shows one embodiment of a message flow involving components in the hosted list service provider and the call center.

A corresponding message flow diagram for one embodiment is shown in FIG. 4. In FIG. 4, the message flow diagram 400 illustrates the electronic consent database 252, the TN list database 255, the front end 254, and the call center 270.

The process begins with message 405 in which the electronic consent database receives an electronic consent file from an enterprise. After receipt and storage, the TN list may be updated by message 410 to reflect the newly added telephone number. Messages 405 and 410 may be repeated over time in order to build the TN list. In operation 415, the TN list is depicted completed.

Subsequently, the call center 270 may request transfer of the TN List in message 420 (e.g., a "pull" approach). This request is directed to the front end 254 using message 420, which responds by verifying the identity of the call center using message 425. The call center 270 responds with appropriate security information in message 430.

Once the call center 270 has been verified/authenticated, then the front end 254 retrieves the TN list in message 435. The TN list database 255 provides the TN list in message 440 to the front end 254. The front end 254 then provides the TN list to the call center in message 445. After the TN list is received, the call center can originate the appropriate campaign as dictated by the campaign requirements in operation 450.

Once the call or campaign is completed, any received opt-out requests are provided in message 455 from the call center to the front end, potentially along with the electronic consent withdrawal data. The front end may confirm the opt-out requests are correct, and update the TN list in message 460 and the electronic consent database 252.

Many variations on the message flow are possible relative to what is provided in FIG. 4. As noted, the call center could inform the front end of each opt-out request as they are encountered. Further, the call center could also request a telephone number or group of numbers from the TN list on an as-needed basis.

Data Structure Format

One possible data structure format used by the hosted list service provider is shown in FIG. 5. This data structure format may be used in the electronic consent database 252, or can be adapted to be used in the TN list database 255. No doubt those skilled in the art will be able to identify variations of data structure formats that can be used in light of the present disclosure. For example, further indicators of the characteristics of the number can be indicated, such as whether the TN is a wireline/wireless number.

In FIG. 5, the format 500 is illustrated having several columns. The first column 505 provides a unique location or identifier of the electronic consent data from the enterprise. This may be a URL or other identifier that identifies an electronic consent file, such as digital scanned image, or a web page, as evidence an individual provided authorization to receive future calls. In this embodiment, three rows 550-570 represent three separate instances of electronic consent. The next column 510 provides an indication of the type of data which is referenced by the link. This embodiment indicates that the electronic consent could be, e.g., a PDF file, a web screen, or a voice file.

The third column 515 may indicate the telephone number for which the electronic consent is provided for. The telephone number is typically in a ten digit telephone number format, comprising an area code, followed by a conventional seven digit local telephone number. Other formats may also include a county code. The fourth column 520 is a date on which permission was last updated. This may reflect the initial date on which permission was granted to the enterprise, or the date on which permission was withdrawn. The last column 525 may include information, such as account information, which may be used in the calling campaign. This can be used by the call center to further filter the TN list or used to select a message to delivery to the called party.

The above example may represent the electronic consent data structure, which may be processed to then generate the TN list. In one embodiment, each record in the data structure format 500 corresponds to a record in the generated TN list, although the fields may be modified. In another embodiment, the records in the electronic consent database may be processed so that a subset of the records and fields form the TN list. For example, the TN list may comprise only those parties who are past due on their account. If so, then the TN list may include the second record 560 and the third record 570, but not the first record 550.

After the hosted list service provider receives updates in the form of called party opt-out requests, the data structure stored by the hosted list service provider may be modified to incorporate flags or other data to indicate that the user has opted-out. Data may also be recorded as to when and how this occurred. This may require adding or updating another column (e.g., a "consent withdrawn"—not shown in FIG. 5). In other embodiments, the entire record could be flagged and/or deleted. If so, then the hosted list service provider may also flag the corresponding electronic consent file as well.

Managing Express Written Consent for Voice and Text Calls

The technologies disclosed herein can be used to manage voice type telemarketing calls and text type telemarketing calls. For purposes herein, a "text type" telemarketing call (or simply "text call") refers to a short message service (i.e., text message) call sent to an individual's mobile device. This includes, e.g., sending a text message to a smart phone. The voice type or voice call refers to a voice-based telephone call. Text calls that solicit the individual may be covered by the same federal regulations as for voice calls that solicit an individual. Text calls do not involve "dialing" a call, but a call is transmitted nevertheless that may be addressed to the recipient's telephone number. While email is a form of messaging, and also involves sending it to a destination address, the destination address is not in the form of a telephone number.

A user may indicate different restrictions with respect to receiving unsolicited telemarketing calls for text calls versus voice calls. To distinguish between this, the electronic consent database 252 may maintain indications as to the type of communication in which the express consent has been received. The express consent may be indicated in a given type of communication (e.g., via SMS, mail, email, voice, web site interaction), but the consent only pertains to granting permission for another type of communication (e.g., voice). Other combinations are possible.

In addition, the user may indicate a withdrawal of permission. Thus, returning briefly to FIG. 2, the user may indicate to the email server 231, the web server 232, the SMS server 234, to an IVR 236, to a voice system 237, or via other means that express written permission is withdrawn with respect to emails, SMS or text messages, voice calls, or other forms. The electronic consent database 252 may retain information not only when this was provided by the enterprise 230, but when the user provided this indication to the enterprise (to the extent that these may be different).

Figure 6:
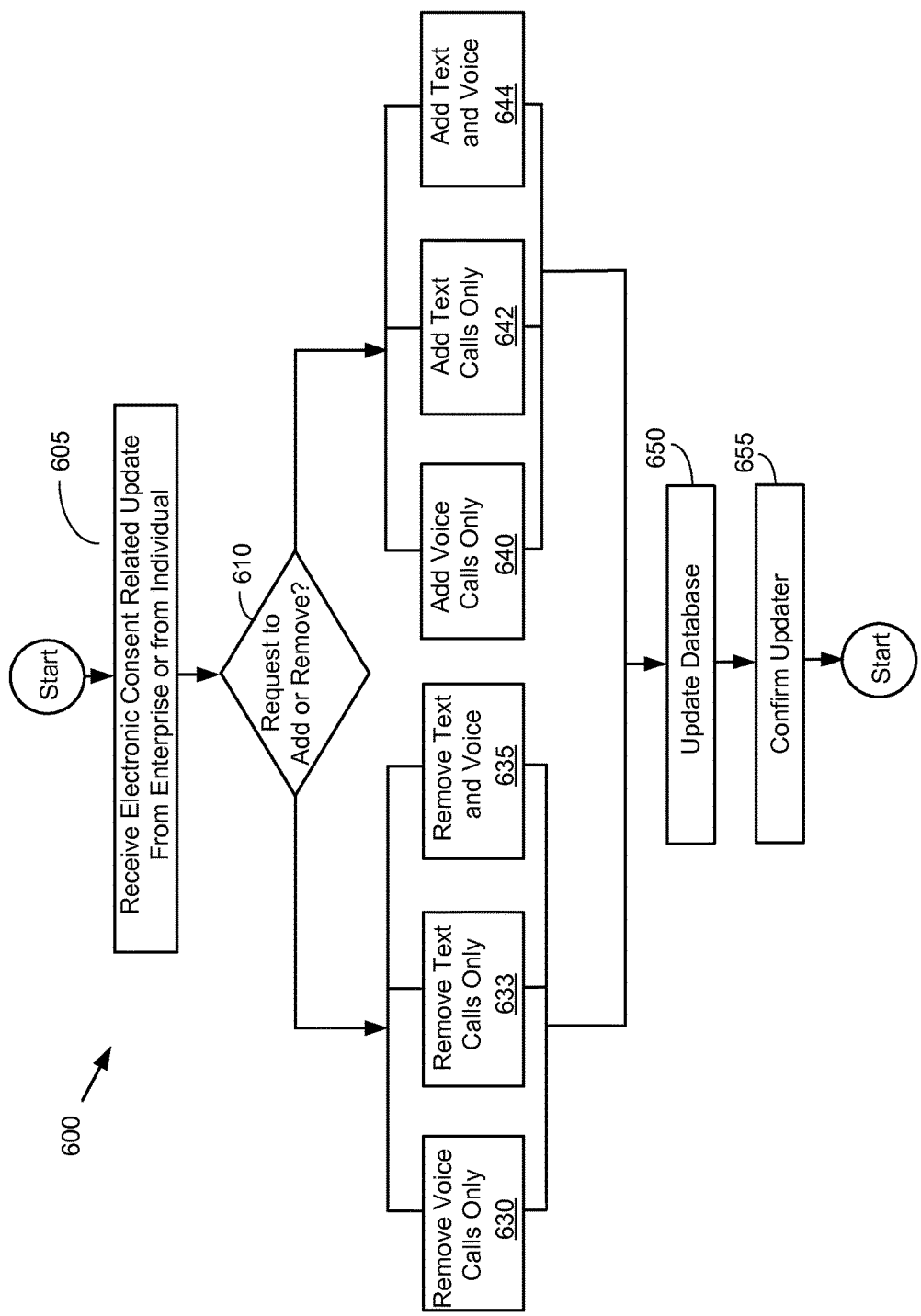
FIG. 6 shows one embodiment of a process flow for updating an electronic consent database with respect to voice and text type calls.

Some of the possible variations that may be indicated are disclosed in FIG. 6. FIG. 6 shows one embodiment of a process flow for updating an electronic database with respect to voice and text type calls. In this process flow, in operation 605 an electronic consent related update is received from an enterprise or from an individual. The electronic consent related update can pertain to either a request to add, or a request to delete, consent for an individual. Further, the request can be received at an electronic consent database from an enterprise, or directly from the individual.

In operation 610, the determination is made whether the request is related to adding or removing electronic consent for an individual. If the request is for removing a request, then processing is according to one of three operations. The request may be for removing electronic consent for voice calls only in operation 630, removing electronic consent for text calls only in operation 633, or removing both in operation 635. Similarly, if the request is to add or grant electronic permission in operation 610, then the request is processed according to one of three operations. The request may be for adding electronic consent in operation 640, adding electronic consent for text calls only in operation 642, or for both in operation 644. Other options are possible for the other identified forms.

Once the request is processed, then operation 650 updates the electronic consent database 252 and provides a confirmation in operation 655. The confirmation can be provided to the enterprise or to an individual originating the request.

In various embodiments, distinct electronic consent databases may co-exist. For example, returning to FIG. 2, an enterprise may rely on a single electronic consent database 252 for managing electronic consent for one type of calls (e.g., voice calls), and the enterprise may maintain a separate database for managing electronic consent for another type of call (e.g., text based calls). The enterprise may operate a system similar in structure to the hosted list service provider 250, but for its own use for. In other words, the enterprise may maintain an internal enterprise-specific database which is independent of the hosted list service provider. The following example provides one embodiment and rationale for doing so.

Figure 7:
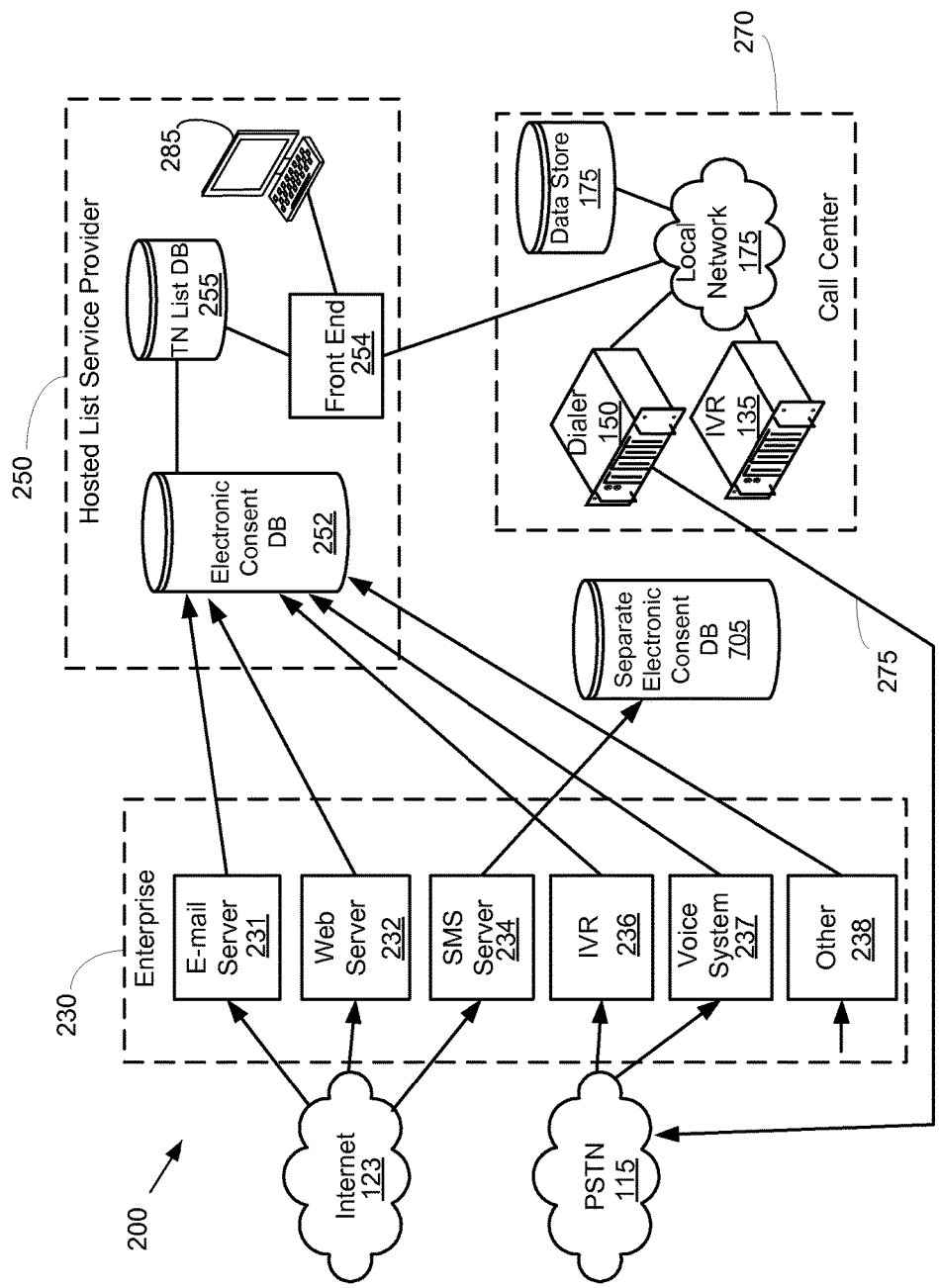
FIG. 7 represent another shows one embodiment of the relationship between an enterprise, a hosted list service provider, and a call center in regards to managing electronic consent for outbound calls involving a separate electronic consent database.

An enterprise may initiate a marketing campaign using, e.g., so-call quick-response ("QR") codes for obtaining electronic consent from an individual. Alternatively, a marketing agency may provide such a campaign on behalf of the enterprise. The QR code allows a camera mobile phone to "read" a 2D bar code on a printed publication and perform an action, such as access a web site, initiate a call, generate a SMS message, start an application, etc. This could be a mechanism for an enterprise to solicit a user for electronic permission. For example, the QR code could result in a SMS message presented to a user, providing authorization for receiving a call or text message containing a solicitation. Specifically, for example, the QR code could cause a text message to be sent from the mobile phone to the enterprise, which indicates in the text body: "Please call me with information about your new product." The message can be construed as electronic consent from that individual for subsequently receiving a telemarketing call on behalf of the enterprise. Such a request would be received at the SMS server 234, and then used to update a separate electronic consent database 705 shown in FIG. 7. The enterprise could provide the subsequent telemarketing call using a call center operated internally or operated by a third party.

The separate electronic consent database 705 could be viewed as storing explicit electronic consent provided to the enterprise. The electronic consent provided by the individual could be dependent on the form of the message indicated in the QR code. For example, if the QR code results in the SMS message indicating "Please send me a text message on your new product", then this could be interpreted as granting access to a receiving a text call. If the QR code results in the SMS message indicating "Please have someone call me on my phone to discuss your new product", then that could be interpreted as granting access to a voice call. If the QR code results in the SMS code indicating "Please contact me about your new product," then that could be interpreting as granting electronic access for either text or voice. The enterprise can then update their electronic consent database appropriately, and the consent may be then transferred to the hosted list service provider.

The management of the enterprise's separate electronic consent database 705 could be managed differently than from the electronic consent database 252 operated by a hosted list service provider. For example, the enterprise's separate electronic consent database may have a self-expiration date based on when consent was granted. For example, after a period of several months, or a number of years, the electronic consent may be set to expire. In one embodiment, this could be 3 months or 5 years.

The separate electronic consent database 705 could be operated and maintained by the enterprise 230, or it could be operated and maintained by another hosted list service provider. The authorization provided on a company specific basis could be noted in the separate electronic consent database, so that each company for which authorization was provided could be identified.

Exemplary Processing Device Architecture

Figure 8:
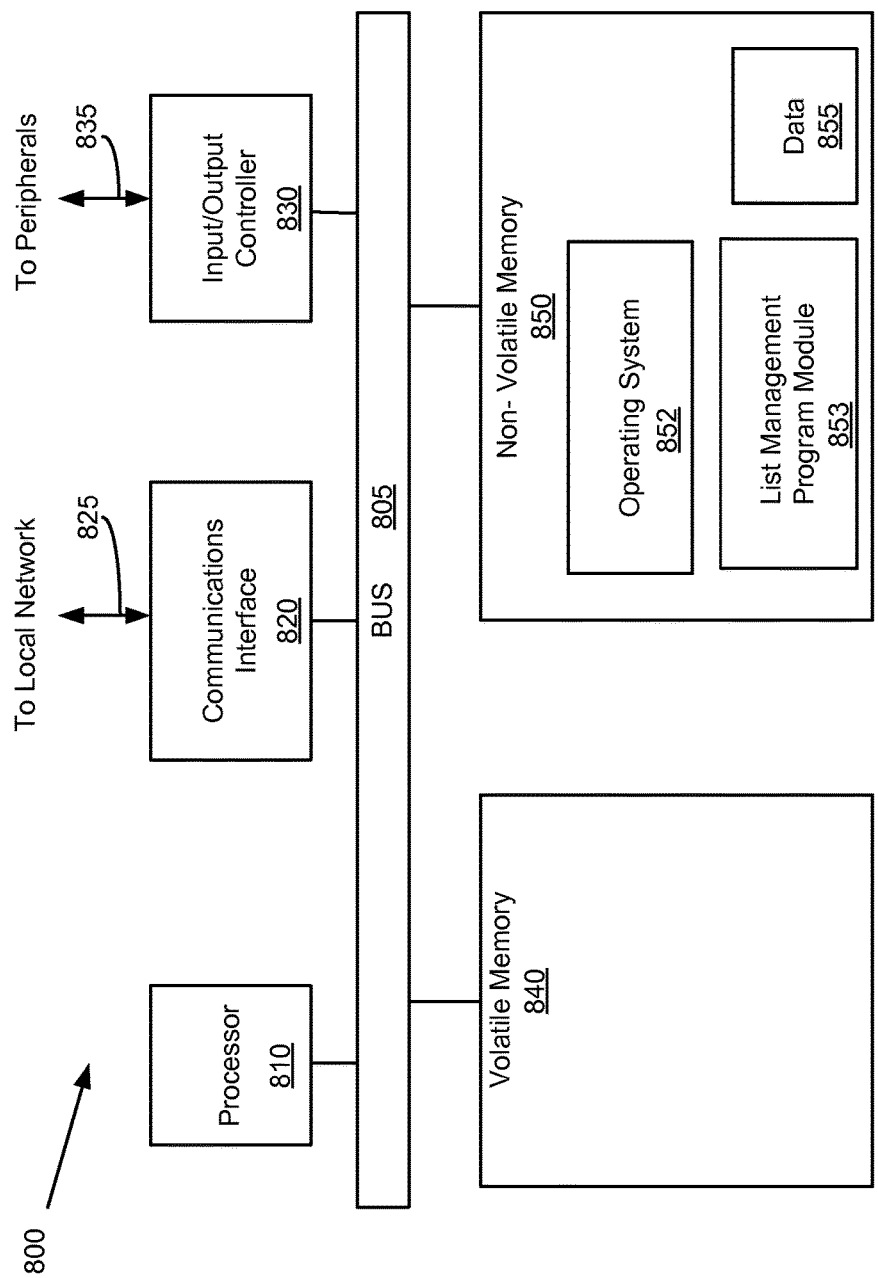
FIG. 8 is an exemplary schematic diagram of a computer processing device used in one embodiment to practice the technologies disclosed herein.

As discussed in conjunction with FIG. 1 and FIG. 2, the call center architecture 100 may comprise various components, such as servers, a front end, and a database that form a processing system. FIG. 8 is an exemplary schematic diagram of a computer processing device that may be used in an embodiment of the call center architecture to practice the technologies disclosed herein. FIG. 8 provides an exemplary schematic of a processing system 800, which could represent individually or in combination, for example, the ACD 130, CTI server 145, dialer 150, front end 254, TN list database 255, electronic consent database 252, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 8, the processing system 800 may include one or more processors 810 that may communicate with other elements within the processing system 800 via a bus 805. The processor 810 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 820 for communicating data via the local network 170 with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 830 may also communicate with one or more input devices or peripherals using an interface 835, such as, but not limited to: a keyboard, a mouse, a touch screen/display input, microphone, pointing device, etc. The input/output controller 830 may also communicate with output devices or peripherals, such as displays, printers, speakers, headsets, banner displays, etc.

The processor 810 may be configured to execute instructions stored in volatile memory 840, non-volatile media 850, or other forms of computer-readable storage media accessible to the processor 810. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 850 may store program code and data, which also may be loaded into the volatile memory 840 at execution time. Specifically, the non-volatile memory 850 may store one or more list management program modules 853 and/or operating system code 852 containing instructions for performing the process and/or functions associated with the technologies disclosed herein. The list management program module 853 may also access, generate, or store data 855, such as the aforementioned TN list and/or opt-out response data, in the non-volatile memory 850, as well as in the volatile memory 840. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 810. These may form a part of, or may interact with, the program module 853.

The technologies described herein may be implemented in various ways, including as computer program products comprising memory storing instructions causing a processor to perform the operations associated with the above technologies. The computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory computer readable medium storing instructions which when executed by a processor cause the processor to:
process electronic consent data ("ECD") in a text call comprising a SMS text message originating from a mobile device, wherein the ECD comprises text indicating consent for receiving a voice call subsequently placed by a contact center directed to a telephone number associated with the mobile device;
store the ECD in an ECD database available for access upon request by the contact center;
store metadata in the ECD database, wherein the metadata comprises the telephone number and an address for retrieval of the ECD in the ECD database;
cause the voice call to be originated to the telephone number; and
connect the voice call to an agent in a contact center.

2. The non-transitory computer readable medium of claim 1, wherein the instructions further cause the processor to:
process an opt-out indication originating from a computer workstation, the opt-out indication identifying the telephone number; and
update the ECD database to reflect the opt-out indication with respect to the telephone number.

3. The non-transitory computer readable medium of claim 1, wherein the instructions further cause the processor to:
verify existence of the ECD by retrieving the ECD using the address in the metadata; and
verify that the ECD has not been updated to reflect an opt-out indication before causing another voice call to be originated to the telephone number.

4. The non-transitory computer readable medium of claim 1, wherein the instructions further cause the processor to:
indicate a date reflecting when the ECD is stored in the ECD database;
determine an expiration date of the electronic consent has not yet occurred based on a current date and the date the ECD is stored in the ECD database; and
allow another voice call to originate to the telephone number based on determining the expiration date has not yet occurred.

5. The non-transitory computer readable medium of claim 1, wherein the ECD is generated in response to the mobile device reading a two-dimensional code.

6. A system for using electronic consent in originating a voice call comprising:
a processor configured to:
receive electronic consent data ("ECD") from an individual in a text call comprising an SMS text message originating from a mobile device, wherein the ECD comprises text indicating consent for receiving the voice call subsequently placed by a contact center directed to a telephone number associated with the mobile device;
store the ECD in an ECD database available for access upon request by the contact center;
store metadata in the ECD database, wherein the metadata comprises the telephone number and an address for retrieval of the ECD in the ECD database; and
originate the voice call, wherein the voice call is between the individual and an agent in the contact center.

7. The system of claim 6, wherein the processor is further configured to:
originate another subsequent voice call to the telephone number by the contact center;
process an opt-out indication after connecting the another subsequent voice call, the opt-out indication originating from a computer workstation in the contact center, the opt-out indication further indicating the telephone number; and
update the ECD database to reflect the opt-out indication with respect to the telephone number.

8. The system of claim 6, wherein the processor is further configured to:
originate another subsequent voice call to the telephone number;
process an indication after connecting the another subsequent voice call to include the telephone number in a do-not-call list; and
update a do-not-call database to reflect inclusion of the telephone number.

9. The system of claim 6, wherein the processor is further configured to:
verify existence of the ECD by retrieving the ECD prior to originating another subsequent voice call; and
verify that the ECD has not been updated to reflect an opt-out indication before causing the another voice call to be originated to the telephone number.

10. The system of claim 6, wherein the processor is further configured to:
  indicate a date reflecting when the ECD is stored in the ECD database;
  determine an expiration date of the electronic consent has not yet occurred based on a current date and the date when the ECD is stored in the ECD database; and
  allow another subsequent voice call to originate to the telephone number based on determining the expiration date has not yet occurred.

11. The system of claim 6, wherein the processor is further configured to:
  verify existence of the ECD by retrieving the ECD prior to originating another subsequent voice call;
  verify that the ECD has not been updated to reflect an opt-out status for the telephone number; and
  in response to verifying the ECD does not reflect an opt-out status for the telephone number, cause the another voice call to be originated to the telephone number.

12. A method for using electronic consent in a contact center, the method comprising:
  receiving electronic consent data ("ECD") in the contact center from an individual in a text call comprising a SMS text message originating from a mobile device, wherein the ECD comprises text indicating consent for receiving a call subsequently placed by the contact center directed to a telephone number associated with the mobile device;
  storing the ECD in an ECD database by a computer in a contact center, wherein the ECD is available for access upon request by the computer;
  storing metadata in the ECD database by the computer, wherein the metadata comprises the telephone number and an address for retrieval of the ECD in the ECD database; and
  originating the call by the computer in the contact center, wherein the call is between the individual and an agent in the contact center.

13. The method of claim 12, further comprising:
  originating another call comprising a voice call to the telephone number by the contact center;
  receiving an opt-out indication verbally after connecting the another call; and
  updating the ECD database to reflect the opt-out indication of the telephone number.

14. The method of claim 12, further comprising:
  originating another call comprising a voice call by the contact center;
  receiving a request from the individual after connecting the another call to include the telephone number in a do-not-call list; and
  updating a do-not-call database to reflect inclusion of the telephone number.

15. The method of claim 12, further comprising:
  verifying existence of the ECD for the telephone number by retrieving the ECD from the database; and
  verifying that the ECD has not been updated to reflect an opt-out indication before originating another call to the telephone number.

16. The method of claim 12, further comprising:
  indicating a date reflecting when the ECD is stored in the ECD database;
  determining an expiration date of the electronic consent has not yet occurred based on a current date and the date the ECD is stored in the ECD database; and
  allowing a voice call to originate to the telephone number based on determining the expiration date has not yet occurred.

17. The method of claim 12, wherein the ECD is generated in response to the mobile device reading a two-dimensional visual code.

18. The method of claim 17, wherein the two-dimensional visual code is a quick-response ("QR") code.

19. The method of claim 12, wherein the ECD also indicates consent for receiving at least one of a voice call or a text call.

20. The method of claim 13, wherein the opt-out indication withdraws the consent for receiving any further calls from the contact center.

* * * * *